United States Patent [19]

Delahaye et al.

[11] Patent Number: 4,890,333
[45] Date of Patent: Dec. 26, 1989

[54] TEST BENCH FOR WIDEBAND RADIO LINK

[76] Inventors: Jean-Yves Delahaye, 14, avenue Pasteur, 92170 Vanves; Jean-Paul Vinson, 8, rue Descartes, 92190 Meudon, both of France

[21] Appl. No.: 84,103

[22] Filed: Aug. 11, 1987

[30] Foreign Application Priority Data

Aug. 14, 1986 [FR] France ................. 86 11759

[51] Int. Cl.[4] .......................................... H04B 17/00
[52] U.S. Cl. ......................................... 455/67; 455/9; 455/42; 324/118; 371/20.4
[58] Field of Search ....................... 455/67, 63, 61, 59, 455/60, 50, 51, 226; 324/118; 371/22

[56] References Cited

U.S. PATENT DOCUMENTS

| | | | |
|---|---|---|---|
| 4,025,854 | 5/1977 | Oades ..................................... | 455/67 |
| 4,363,131 | 12/1982 | Froese et al. ........................ | 455/42 |
| 4,365,346 | 12/1982 | Froese et al. ........................ | 455/42 |
| 4,375,698 | 3/1983 | Onotera et al. ...................... | 455/67 |

Primary Examiner—Thomas H. Tarcza
Assistant Examiner—John B. Sotomayor
Attorney, Agent, or Firm—Laubscher, Presta & Laubscher

[57] ABSTRACT

A test bench is designed to determine the transfer function of a radio link in terms of variations in amplitude and a group propagation time depending on frequency. A transmission section of the test bench comprises an oscillator delivering a pulse signal having a predetermined intermediate frequency, a generator generating an exploration signal having a predetermined low frequency and a marking pulse signal synchronous with the exploration signal, a summator summating the exploration signal and an analog signal into a wobbulation signal, a r.f. wobbulator controlled by the wobbulation signal for producing a wobbulated signal to be transmitted. In a receiving section of the test bench, an analyzer receives the wobbulated signal via said radio link to analyze parameters of the radio link, such as the link group propagation time. According to the invention, the transmission section comprises a modulator for modulating the intermediate-frequency pulse signal during pulses of said marking pulse signals thereby deriving a periodically modulated measurement signal forming said analog signal applied to the summatior, and the receiving section comprises a frequency recovering circuit for deducing signals synchronous with the exploration signal as from signals produced by the analyzer.

11 Claims, 5 Drawing Sheets

TEST BENCH FOR WIDEBAND RADIO LINK

BACKGROUND OF THE INVENTION

1. Field of the Invention

This invention relates to a test bench for total or partial wideband radio links.

Radio link test benches, also referred as to radio link analyzers, are used to determine the transfer function of all or part of the radio link. The transfer function is designed by variations in amplitude and the group propagation time depending on the frequency. The wideband measurement techniques, i.e, for a bandwidth greater than 100 MHz, apply to wideband radio transmission equipment such as those included in the land-based transmission systems or earth-satellite transmission systems, or their subassemblies, such as waveguides or antennae, common to the whole communication passband, and also to the propagation environment.

2. Description of the Prior Art

In a radio link test bench, a frequency variation is derived over each frequency within the frequency band being explored to obtain, on receiving, a corresponding phase variation in the received signal. From this phase variation it is possible to determine the group propagation time equal to the derivative of the phase depending on the frequency.

Such a test bench includes a transmission section and a receiving section. On transmission, a radio frequency wobbulator receives on input the sum of low-frequency signal controlling the exploration of the frequency band of the link and a measurement signal at intermediate frequency to supply on output, a radio frequency signal wobbulated by the input signal. The wobbulated radio frequency signal is transmitted by the wideband radio link. On receiving, the received wobbulated radio frequency signal is reduced to a lower frequency by a frequency down-converter and is then demodulated in a radio link analyzer so as to obtain the group propagation time information. The amplitude information is deduced by simply detecting the amplitude of the wobbulated signal on output from the frequency down-converter.

In order to determine the transfer function of the radio link on receive, it is necessary to know at each moment the frequency of the wobbulated radio frequency signal received. It would therefore appear that the frequency information should be measured in the receiving section or that it should be transmitted as from the transmission section, for example via pulses carried by the wobbulated radio frequency signal emitted. Each pulse corresponds to exploration passing through certain predetermined frequencies of the band. Owing to the nonlinearity and unstability of the frequency compression, the receiving measurement on output from the down-converter is subject to error. The signal can also be disturbed by the propagation environment examined or by the transmission equipment.

Two techniques employed to identify frequencies have been described in the paper by Robert EASSON and Robin SHARP entitled "AMELIORATION DES MESURES SUR LES EQUIPMENTS FAISCEAU HERTZIEN AU MOYEN D'UN CONVERTISSEUR-ABAISSEUR A POURSUITE" ("Improvement to measurements on radio links by means of a tracking down-converter") read at the "SYMPOSIUM sur les TELECOMMUNICATIONS et la TELEINFORMATIQUE" on Mar. 14 and 15, 1986, Palais des Congrès, Versailles, France.

A first known technique consists in producing, on receiving, a marking signal for one frequency. The high frequency signal taken on receiving, via a directional coupler, is sent to a cavity type wavemeter followed by a detector, to obtain a synchronization pulse when passing through the tuning frequency of the cavity. This technique however offers the drawback of requiring a cavity that can be tuned by a frequency in the band explored, to be identified. In this technique, as the pulse amplitude depends on the level of received signal, the frequency information is liable to be indiscernable from the signal amplitude variations, which may entail errors in identifying the frequencies.

Another technique consists in modulating, on transmission, the amplitude of the radio frequency signal, by pulses at times corresponding to the exploration passing through predetermined frequencies of the explored band. On receiving, a series of marking pulses is obtained and is added to the amplitude information signal. With this technique it is not possible to make a correct separation between the frequency information and the amplitude information. In fact, either the amplitude modulation is too weak and the pulses intermingle in the amplitude variations, and it is impossible to discern them, or else the amplitude modulation is too strong and the receiver receives an insufficient signal. Moreover, the measurement of the amplitude variations is erroneous owing to the presence of the marking pulses.

The accuracy obtained by these known techniques is low and generally limited by the width of the marking pulses or by the nonlinearity of frequency-compression receiving. The relative error obtained for an excursion of around 1 GHz is about 5%.

OBJECT OF THE INVENTION

The main object of the invention is to provide a wideband radio link testing bench offering great accuracy in the identification of the frequencies on receiving, without for so much impairing the measurements, and whatever the amplitude variations of choosen parameters.

SUMMARY OF THE INVENTION

Accordingly, a radio link test bench comprises a transmission section and a receiving section. In the transmission section are provided for a measurement oscillator for delivering a pulse signal having a predetermined intermediate frequency, means for generating an exploration signal having a predetermined low frequency and a marking pulse signal synchronous with the exploration signal, means for summating the exploration signal and an analog signal into a wobbulation signal, means for modulating the intermediate-frequency pulse signal during pulses of the marking pulse signal so as to derive a periodically modulated measurement signal forming said analog signal applied to the summating means, and radio frequency wobbulation means controlled by the wobbulation signal for producing a wobbulated signal to be transmitted to the receiving section through the radio link. In the receiving section are provided for means receiving the wobbulated signal for analyzing parameters of the radio link, such as the link group propagation time, and means for deducing signals synchronous with the exploration signal as from signals produced by the analyzing means.

The test bench embodying the invention offers a number of advantages:

accuracy in the frequency identification of about 0.2% within the explored frequency band;

measurements which are in no way disturbed;

the measurement signal can be modulated in different ways, notably to convey into the test bench, apart from the information required for frequency identification, service information, between the transmission and receiving sections.

BRIEF DESCRIPTION OF THE DRAWING

Further features and advantages of the invention will be more clearly apparent from the following particular description of several preferred embodiments of this invention as illustrated in the corresponding accompanying drawings in which.

DESCRIPTION OF THE PREFERRED EMBODIMENTS

Figure 1:
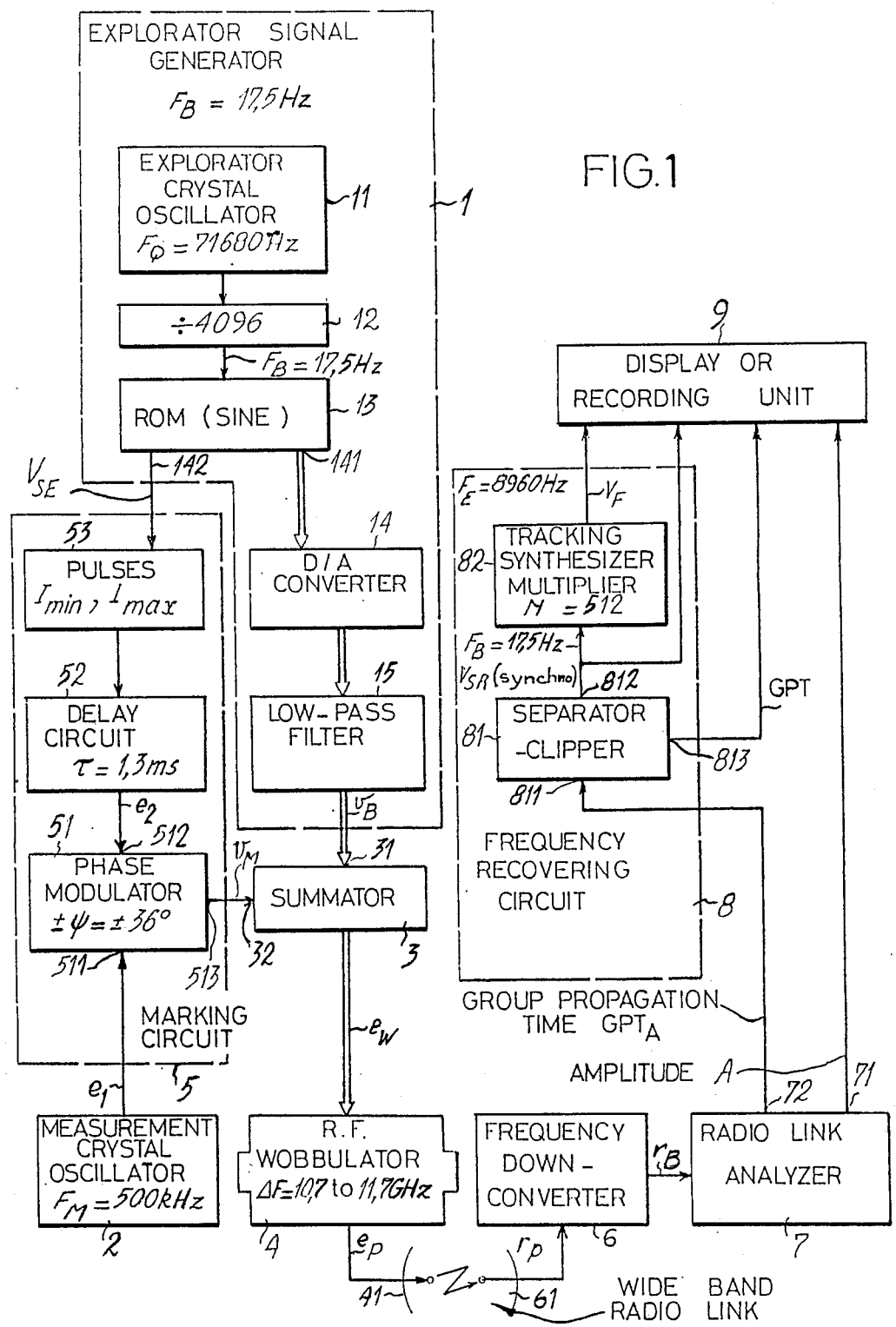
FIG. 1 is a block diagram of a particular embodiment of a test bench according to the invention, using a measurement signal phase modulation to carry the frequency identification information.

Referring to FIG. 1 a test bench includes, in a transmission section, an exploration signal generator 1 producing a sine-wave exploration analog signal $v_B$ having a predetermined low frequency $F_B$, a measurement crystal oscillator 2 producing a pulse signal $e_1$ having a predetermined intermediate medium frequency $F_M$, a two-input analog summator or summing means 3, and a radio frequency wobbulator 4 controlled by a wobbulation control signal $e_W$ derived by summator 3 so as to produce a radio frequency signal in a very high frequency band of predetermined wobbulation carrier $\Delta F_W$ to be transmitted by transmission equipment 41 of a wideband radio link.

So as to clarify matters we shall henceforth refer to a practical embodiment for which $F_B$ and $F_M$ are equal to 17.5 Hz and to 500 kHz, respectively, and $\Delta F_W$ is between 10.7 and 11.7 GHz.

In generator 1, the sine-wave exploration signal $v_B$ is obtained by digital sine-wave generating means controlled by a high stability oscillator. Thus a crystal oscillator 11 derives a pulse signal having typically a frequency $F_Q = 71680$ Hz, and a divide-by-4096 frequency divider 12 is coupled to an output of oscillator 11 and supplies a pulse signal at frequency $F_B = 71680/4096 = 17.5$ Hz. An ROM memory 13 contains digital sample words of a sine-wave. Memory 13 is cyclically read addressed by the outgoing signal from frequency divider 12 to deliver the parallel bit sample words of the sine-wave in a bus 141, at each period $1/F_B$. The read sample words are converted analogically in a digital/analog converter 14 coupled to bus 141, into the perfectly sine-wave analog signal $v_B$ which is applied to a first input 31 of summator 3 via a low-pass filter 15.

Figure 2:
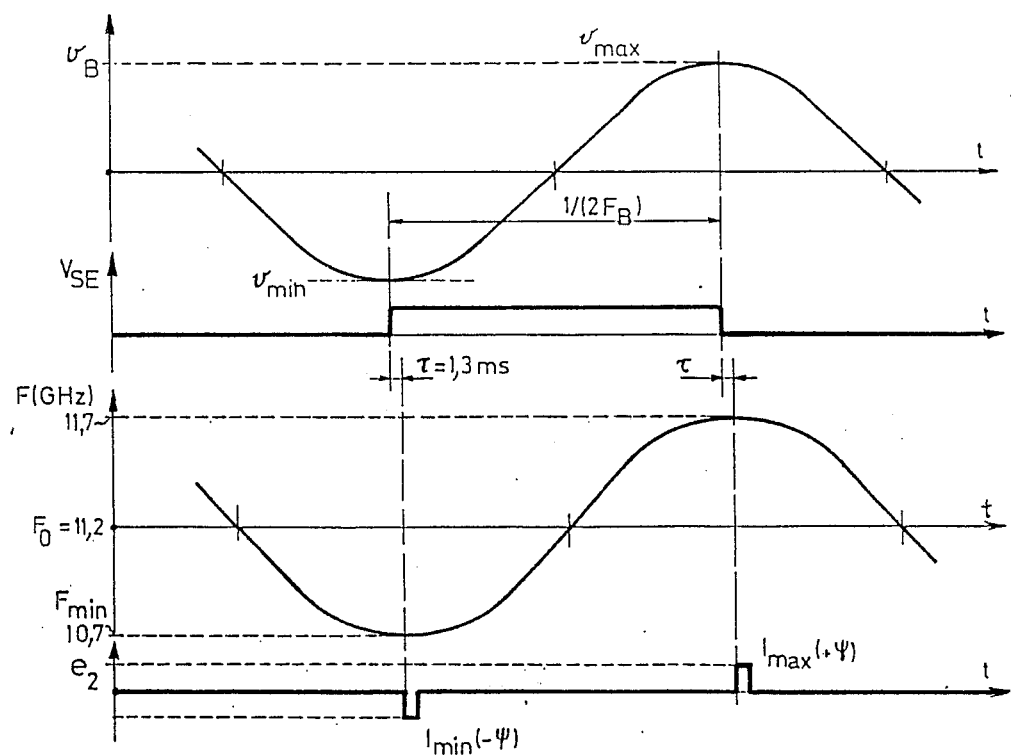
FIG. 2 shows waveforms of signals derived in the transmission section of the test bench shown in FIG. 1.

Signal $v_B$ is shown at the top of FIG. 2, whereas below, in the same figure, is shown a pulse signal $V_{SE}$ delivered by an output 142 of ROM memory 13. The signal $V_{SE}$ contains pulses having a width of $1/(2F_B)$, each pulse having positive-going, or rising, and negative-going, or falling, edges synchronous with minimum and maximum voltages $v_{min}$ and $v_{max}$ of the sine-wave $v_B$, respectively.

As also shown in FIG. 1, the transmission section of the test bench includes a marking circuit 5. Circuit 5 comprises a phase modulator 51 having a first input 511 receiving the measurement signal $e_1$ and a second phase control input 512 receiving a marking pulse signal $e_2$, as shown at the bottom of FIG. 2. Signal $e_2$ is produced via a differentiator circuit 53 and a delay circuit 52 series-connected between terminals 142 and 512. Circuit 53 includes, for example, two differentiators or two monostable flip-flops that can be triggered by rising and falling edges of pulses of signal $V_{SE}$ so as to produce negative phase marking pulses $I_{min}$ and positive phase marking pulses $I_{max}$ having a very low width with respect to $1/(2F_B)$, respectively, in response to the $v_{min}$ and $v_{max}$ peaks of signal $v_B$.

According to the practical embodiment, the $I_{min}$ and $I_{max}$ pulses respectively control phase shifters of $-\Psi = \pi/5 = -36°$ and $+\Psi$ included in the phase modulator 51. Thus measurement signal $v_M$ has three phase states $-\Psi$, $+\Psi$ and 0 and corresponds to the pulse signal $e_1$, respectively, with a phase lag of $-\Psi$, a phase advance $+\Psi$ and no phase shift during the $I_{min}$ pulses, the $I_{max}$ pulses and between these pulses. Signal $v_M$ is applied by an output 513 of modulator 51 to a second input 32 of summator 3.

The delay circuit 52 imposes a delay $\Gamma$, typically of 1.3 ms, so as to compensate for a delay introduced by the transfer function of wobbulator 4 between the component of its output signal corresponding to the measurement signal $v_M$ at intermediate frequency and the component corresponding to the exploration signal $v_B$ at low frequency.

The phase modulated measurement signal $v_M$ and the exploration signal $v_B$ are added into the wobbulation control signal $e_W$ in summator 3. Signal $e_W$ conventionally controls the wobbulation in wobbulator 4, the $v_{min}$ and $v_{max}$ peaks corresponding to minimum frequencies $F_{min} = 10.7$ GHz and maximum $F_{max} = 11.7$ GHz of the carrier frequency range $\Delta F_W$ for which the transfer function of the radio link is analyzed. A wobbulated signal $e_P$ is then transmitted in the radio link via transmission equipment 41. A third line in FIG. 2 shows the mean variation in the frequency F of signal $e_P$ due to the signal $e_W$, the measurement signal $v_M$ having an amplitude and a frequency distinctly lower and higher than those of signal $v_B$, respectively.

In a receiving section of the test bench, also shown in FIG. 1, it is normally found after radio frequency receiving equipment 61, a frequency down-converter 6 transposing the frequency band $\Delta F$ of a received signal $r_P$ corresponding to the signal transmitted signal $e_P$, into a frequency band, typically of 25 MHz, centered around a 141 MHz frequency. A frequency-transposed wobbulated signal $r_P$ delivered by converter 6 is applied to a known radio link analyzer 7 which, through a first output 71, supplies a signal A obtained by amplitude detection of the frequency-transposed wobbulated signal $r_B$. Signal A has an amplitude in proportion to that of the radio frequency signal received $r_P$ and corresponds to the transmission loss of the radio link for explored the frequency band. The signal A from the radio link analyzer 7 is applied directly to a display or recording unit 9.

Figure 3:
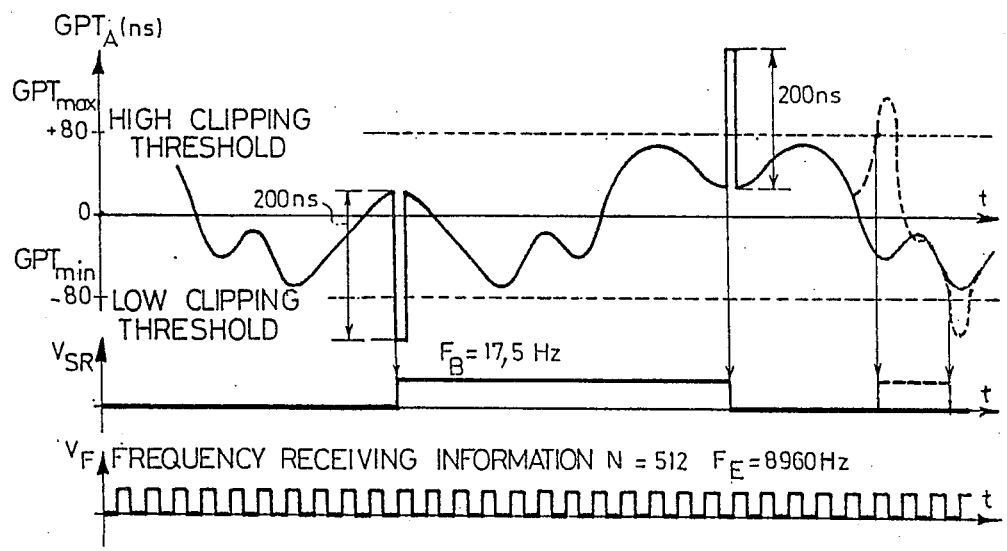
FIG. 3 shows the waveforms of signals derived in the receiving section of the test bench shown in FIG. 1.

The radio link analyzer 7 also supplies, via a second output 72, a signal $GPT_A$ obtained from the wobbulated signal $r_B$ by frequency demodulation followed by phase demodulation at the measurement frequency $F_M$ equal to 500 kHz. The signal $GPT_A$, shown at the top of FIG. 3, is equivalent to the sum of a GPT signal proportional to the group propagation time and of a pulse signal proportional to the marking pulse signal $e_2$ carrying the $I_{min}$ and $I_{max}$ marking pulses.

As shown in FIG. 1, the $GPT_A$ signal is transmitted to a frequency recovering circuit 8. Circuit 8 comprises a separator - clipper circuit 81 and a known tracking synthesizer - multiplier 82. The separator - clipper circuit 81 receives, via an input 811, the signal $GPT_A$ delivered from analyzer 7 and carrying the marking pulses $I_{min}$ and $I_{max}$ and provides, via a first output 812, a receiving synchronization signal $V_{SR}$ and, via a second output 813, the signal GPT proportional to the group propagation time and applied to display or recording unit 9. The receiving synchronization signal $V_{SR}$ is obtained after clipping operations beyond a high clipping threshold $GPT_{max}=2/(25 \text{ MHz})=80$ ns and a low clipping threshold $GPT_{Min}=80$ ns. As shown in the second line of FIG. 3, the signal $V_{SR}$ is a pulse signal at frequency $F_B$ of 17.5 Hz whose rising edges correspond to the $I_{min}$ pulses and thus to frequency $F_{min}=10.7$ GHz, and whose falling edges correspond to the $I_{max}$ pulses, and hence to frequency $F_{max}=11.7$ GHz. The signal $V_{SR}$ is applied to display or recording unit 9 and to the tracking synthesizer - multiplier 82. As from the signal $V_{SR}$ the synthesizer performs a multiplication operation on frequency $F_B$ by a factor N, here equal to 512, to obtain a frequency sampling signal $V_F$, as shown at the bottom of FIG. 3, whose sampling frequency $F_E$ of 8960 Hz is equal to the frequency $F_B=17.5$ Hz multiplied by the factor $N=512$. The sampling signal $V_F$ is strictly synchronous to the synchronization signal $V_{SR}$ and enables to supply N frequency references in the explored carrier frequency band $\Delta F_W$ to the visual display unit.

In this embodiment, where $\Delta F_W$ lies between 10.7 GHz and 11.7 GHz and N is equal to 512, the frequencies are displayed with an increment of about $1000/512=19.5$ MHz.

In the test bench embodying the invention, the exactitude of the information relating to the recovered frequency basically depends on the linearity of the voltage - frequency conversion obtained by the radio frequency wobbulator together with the leading edges of the marking pulses. The error produced by the leading edges is quite negligible as compared to the error due to the nonlinearity of wobbulator 4. The wobbulator used is YIG type, and consists of HP 86245A apparatus option H12 and HP 8350B sold by HEWLETT-PACKARD. In these conditions, the relative frequency error measured at an ambient temperature of 25° C. is approximately 0.2% with a frequency band comprised between 10.7 GHz and 11.7 GHz.

Figure 4:
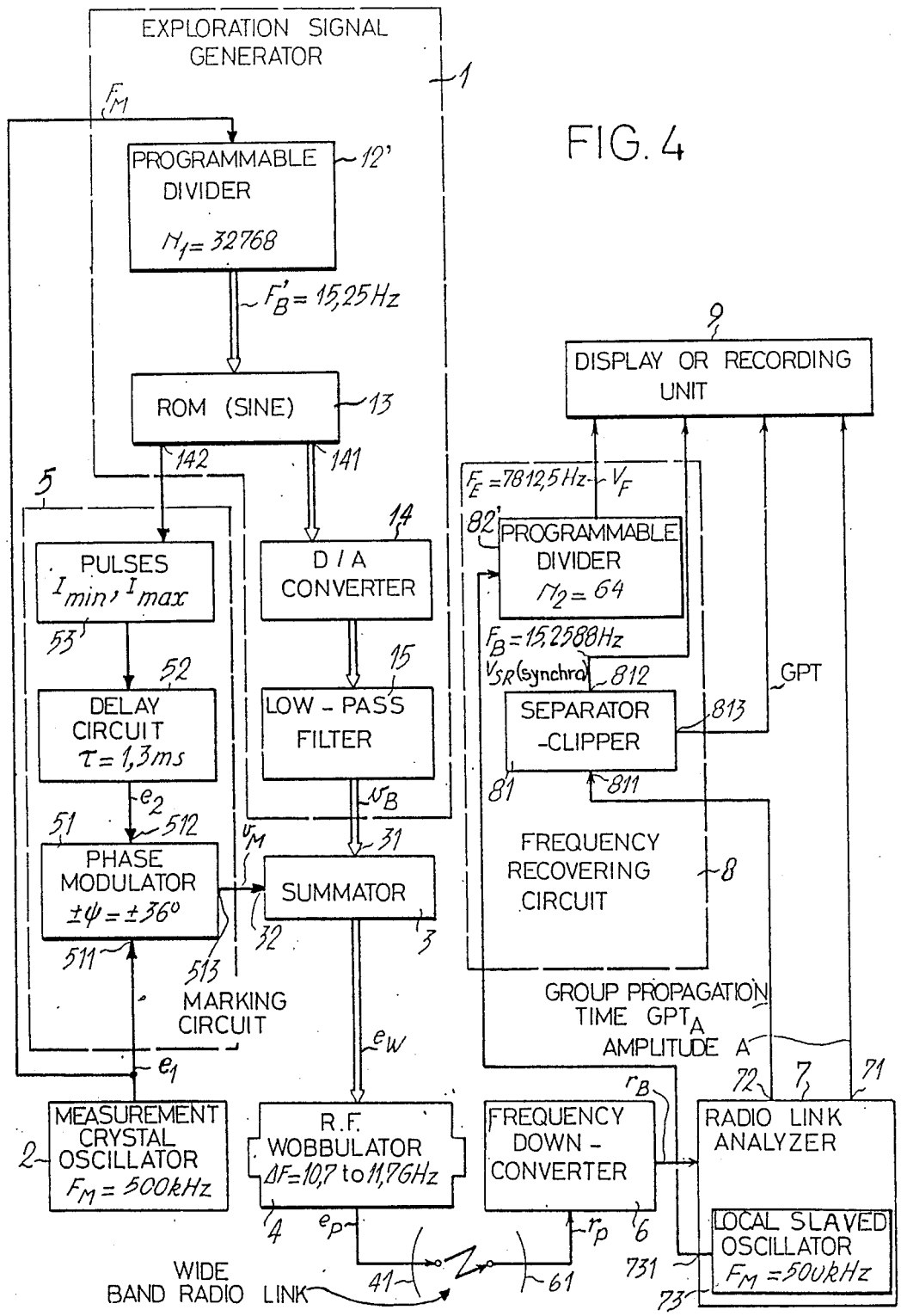
FIG. 4 is a functional block diagram of a simplified embodiment of the test bench similar to that shown in FIG. 1.

FIG. 4 shows a simplified test bench as compared to the previous embodiment. In this test bench, elsewhere identical, two simplifications have been provided so as to reduce its cost. A first possibility of simplification consists in driving the exploration signal generator 1 by the measurement crystal oscillator 2. For this purpose the high stability oscillator 11 and frequency divider 12 in the exploration signal generator 1, according to the previous embodiment, are replaced by a programmable frequency divider 12', as shown in FIG. 4. The programmable frequency divider 12' receives the pulse signal $e_1$ at frequency $F_M$ of 500 kHz from the measurement crystal oscillator 2 and supplies on output a pulse signal at low frequency $F'_B$ of 15.2588 Hz, for a frequency ratio $N_1$ programmed at 32768. ROM memory 13 is then addressed at frequency $F'_B=15.2588$ Hz to generate an exploration signal $v_B$ 'and a marking pulse signal $e_2$ of the same frequency.

A second simplification integrated with the first one, consists in replacing, in the receiving section, the tracking synthesizer - multiplier 82 in the frequency recovering circuit 8, by a programmable frequency divider 82', as shown in FIG. 4. In fact the radio link analyzer 7 includes, as known, a local frequency oscillator 73 strictly slaved by frequency $F_M$ of the measurement crystal oscillator 2 in the transmission section, for the phase demodulation requirements. The slaved crystal oscillator 73 supplies, via an output 731 of analyzer 7, a frequency $F_M$ signal synchronous with the receiving synchronization signal $V_{SR}$, known that the $V_{SR}$ is derived from the marking pulses generated from the measurement crystal oscillator 2 in the transmission section.

The frequency signal $F_M$ of 500 kHz from output 731 is applied on input to frequency divider 82' to supply on output a frequency sampling signal $V_F$ having a frequency $F_E$ equal to 7812.5 Hz and corresponding to a division ratio programmed to $N_2=64$. The ratio $N_2$ is adopted to obtain a number M of frequency references always equal to 512 in unit 9.

In the two embodiments previously described and shown in FIGS. 1 and 4, the receiving synchronization signal $V_{SR}$ can be disturbed with high $F_B$ frequencies of the exploration signal $v_B$, i.e., for frequencies greater than 100 Hz. In fact, as shown by the waveforms in short dotted lines in FIG. 3, the signal $GPT_A$ in its section containing the group propagation time information then undergoes strong variations and exceeds the $GPT_{max}$ high and $GPT_{min}$ low clipping thresholds. It is therefore desirable to eliminate the interaction between these two signals, notably recovering the marking pulses on the demodulation in the ratio link analyzer 7. As will be apparent in the following paragraphs, other types of modulation of the measurement signal $v_M$ by marking pulses can, among other things, achieve this objective.

Phase modulation of the measurement signal $v_M$ can, for this objective, by advantageously replaced by frequency modulation. For example, in the case of obtaining receiving synchronizations from a single identified frequency, the marking pulses can be all positive and correspond to a predetermined frequency.

Figure 5:
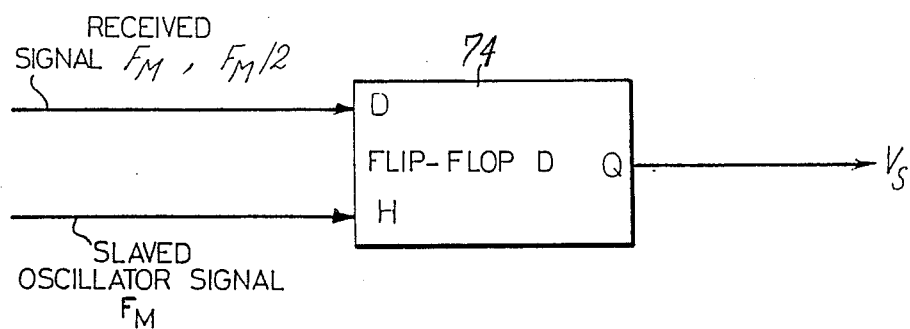
FIG. 5 shows a demodulator including a flip-flop D, to recover marking pulses.

A first solution consists in replacing phase modulator 51 in the transmission section, by a frequency divide-by-2 circuit also having two inputs 511 and 512 and one output 513. The measurement signal $v_M$ delivered by the divider circuit has two frequency states. Between the $I_{min}$ and $I_{max}$ marking pulses of signal $e_2$, the measurement signal $v_M$ is at frequency $F_M=500$ kHz delivered by the measurement crystal oscillator 2. During each of the $I_{min}$ and $I_{max}$ pulses, the signal $v_M$ is at frequency $F_M/2 = 250$ kHz. In the receiving section, a signal corresponding to the two frequency states, $F_M$ and $F_M/2$, is detected on the radio link analyzer 7, by frequency demodulation on the wobbulated signal $r_B$ from the frequency down-converter 6. FIG. 5 shows a way of recovering the marking pulses, in the receiving section, by means of a type D flip-flop 74 having a data input D receiving the signal with two frequency states, $F_M$ and $F_M/2$, and a clock input H receiving a signal at frequency $F_M$ delivered by the slaved local oscillator in the radio link analyzer 7. An output Q of flip-flop 74 then delivers a pulse train $V_S$ at frequency $F_M/2$ during each of the $I_{min}$ and $I_{max}$ marking pulses.

Figure 6:
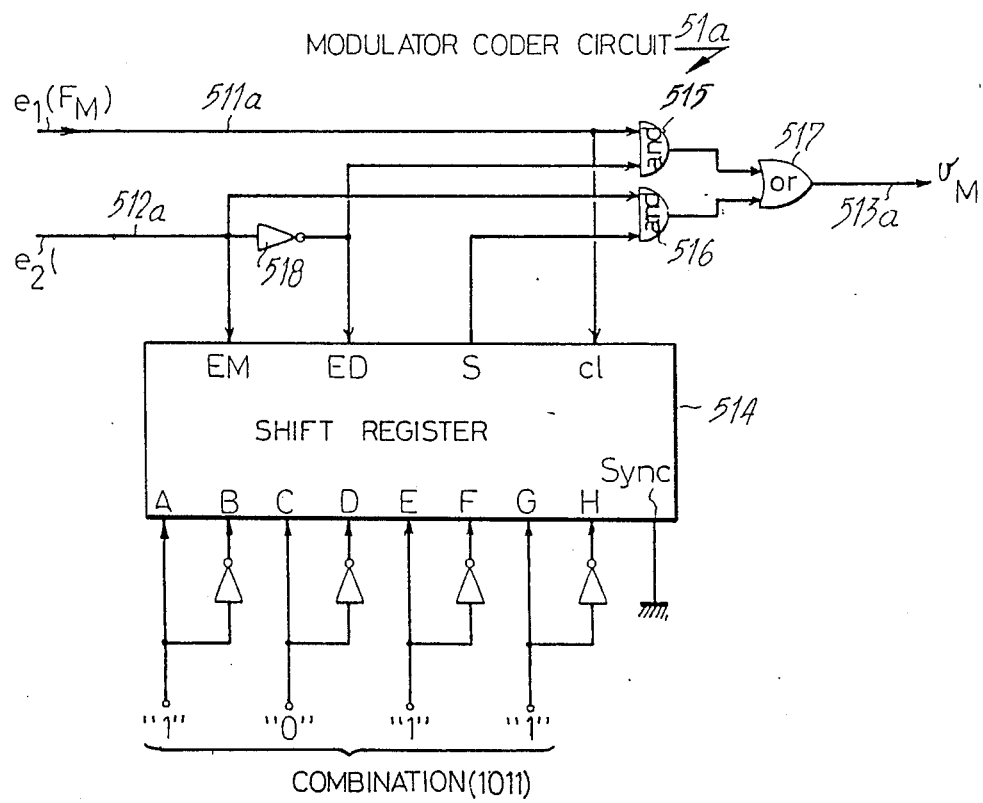
FIG. 6 shows schematically, a modulator - encoder circuit whereby encoded marking pulses can be generated, for aperfected version of the test bench embodying the invention.
Figure 7:
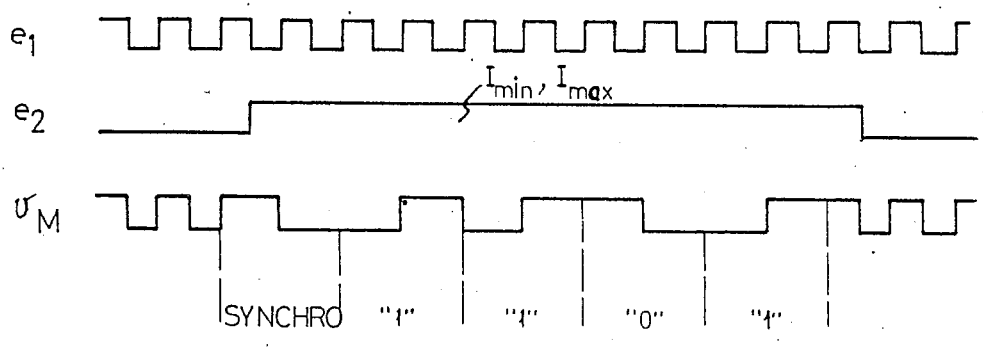
FIG. 7 shows waveforms of signals received and derived by the modulator - encoder circuit in FIG. 6.

Another solution moreover enables service information to a transmitted between the transmission section and receiving section of the test bench, and consists in an encoded frequency modulation of measurement signal $v_M$. FIG. 6 illustrates an embodiment of modulator-encoder circuit 51a performing an encoded frequency modulation of measurement signal $v_M$. Circuit 51a replaces phase modulator 51 and has two inputs 511a and 512a and one output 513a corresponding to terminals 511, 512 and 513 of modulator 51 respectively. Circuit 51a includes a shift register 514 having four pairs of parallel inputs A-B to G-H and a serial output S, two two-input AND gates 515 and 516, one two-input OR gate 517 and an inverter 518. According to the illustrated embodiment, the A-B to G-H input pairs of register 514 are coupled to an read-only-memory, of wired memory type, having stored a four-digit two-phase code word "1011". A terminal Sync of register 514 is grounded so that the register transmits the encoded word succeeding to a synchronization signal in response to the pulses of signal $e_2$, as shown in FIG. 7. Signal $e_2$ is applied directly and through inverter 518 to control inputs EM and ED of register 514, and the measurement signal $e_1$ is applied to a clock input c1 of register 514 so that the register is activated between the rising and falling edges of each of the $I_{min}$ and $I_{max}$ pulses, these being rectified in circuit 53 in this embodiment. The first AND gate 515 has two inputs receiving respectively signal $e_1$ and a complementary signal of signal $e_2$ supplied by inverter 518 so as to transmit the pulses of signal $e_1$ between the $I_{min}$ and $I_{max}$ pulses. The second AND gate 516 has two inputs for receiving signal $e_2$ and for receiving the synchronization signal and code word via output S of register 514, respectively, to transmit the synchronization signal and code word during the $I_{min}$ and $I_{max}$ pulses. The OR gate 517 has two inputs coupled to the outputs of gates 515 and 516 and delivers the $v_M$ signal via terminal 513a.

The last waveform in FIG. 7 corresponds to measurement signal $v_M$ obtained during the $I_{min}$, $I_{max}$ marking pulses for a "1001" code word.

Figure 8:
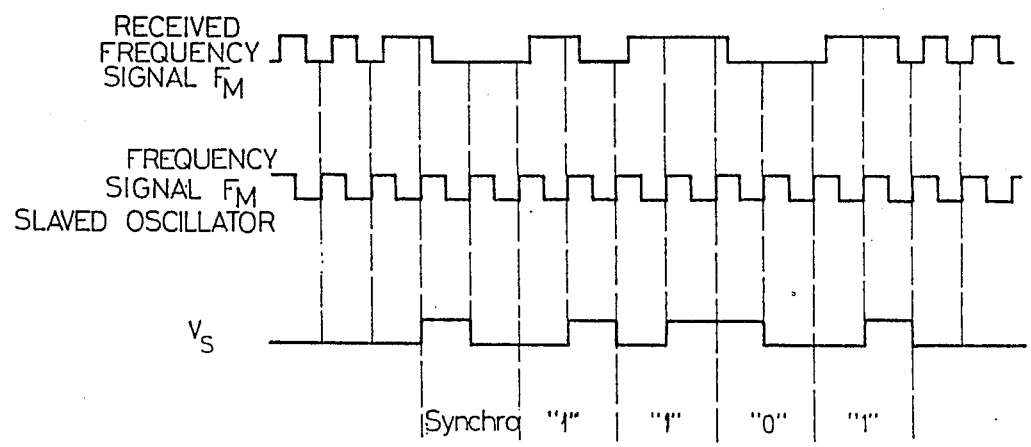
FIG. 8 shows waveforms of signals received and derived by the demodulator in FIG. 5, in the case of an embodiment using a modulator - encoder circuit as in FIG. 6.

In the receiving section of the test bench, the encoded pulses can be demodulated in the same way as previously via flip-flop 74 shown in FIG. 5. The last waveform in FIG. 8 corresponds to the pulse train $V_S$ recovered on output Q of the flip-flop for the same code word "1001". The pulse train $V_S$ is then used to supply a receiving synchronization pulse and a service information corresponding to the code word. This service information can, for example, be used to indicate, on receiving, the central frequency of the band explored frequency band $\Delta F_W$, or the width of this same band $\Delta F_W$.

In both the above embodiments, using frequency modulation and encoded frequency modulation of the measurement signal $v_M$, the synchronization information remains highly stable and independent of the variations in the measured signals. The entered absolute error remains less than a half-period $1/(2F_M)$, and is very slight and quite negligible as compared to the error due to the radio frequency wobbulator 4.

What we claim is:

1. A radio link test bench system, comprising:
    (1) transmission station means, including:
        (a) means including a measurement oscillator (2) for supplying a pulse signal ($e_1$) having a predetermined intermediate frequency ($F_m$);
        (b) generator means (13) for generating:
            (1) an analog exploration signal ($V_B$) having a predetermined low frequency, and
        (2) a marking pulse signal ($e_2$) synchronous with said exploration signal;
        (c) modulator means (51) for modulating said intermediate frequency pulse signal ($e_1$) during pulses of said marking pulse signal ($e_2$) to derive a periodically modulated analog measurement signal ($V_m$);
        (d) summing means (3) for adding said exploration signal ($V_B$) and said periodically modulated measurement signal ($V_m$) to form a wobbulation control signal ($e_w$);
        (e) radio frequency wobbulation means (4) controlled by said wobbulation control signal for producing a wobulated signal ($e_p$); and
        (f) means 41) for transmitting said wobbulated signal; and
    (2) receiving station means including;
        (a) means (61) for receiving said wobbulated signal;
        (b) radio link analyzer means (7) for analyzing said wobbulated signal to define:
            (1) a first signal (A) that is a function of a parameter of the received wobbulated signal;
            (2) a second signal ($GPT_A$) corresponding with the sum of a signal (GPT) proportional to the group propagation time and a pulse signal proportional to the marking pulse signal ($e_2$); and
        (c) means for deducing from said second signal ($GPT_A$);
            (1) said group propagation signal (GPT); and
            (2) a synchronizing signal ($V_{SR}$) that is a function of said marking pulse ($e_2$) and exploration ($V_B$) signals; and
        (d) indicator means (9) for indicating at least one of said parameter (A), synchronous ($V_{SR}$) and group propagation time (GPT) signals.

2. The test bench claimed in claim 1, wherein said deducing means comprises means (81) connected to said analyzing means for recovering pulses of said marking signal, thereby supplying said receiving synchronization signal, and means connected to said pulse recovering means for delivering a frequency signal ($V_F$) having a sampling frequency equal to said synchronization signal multiplied by an integer factor, said receiving synchronization signal and said frequency signal being synchronous with said exploration signal.

3. The test bench claimed in claim 1, wherein said generator means comprises oscillator means (11) for generating a low frequency pulse signal, a read-onlymemory (13) containing digital samples defining said exploration signal and read controlled by said low-frequency pulse signal, means (14,15) for converting said read digital samples into said exploration signal, and means (53) for producing said pulses of said marking signal depending on a read synchronization signal having said low frequency and produced by said memory.

4. Apparatus as defined in claim 3, wherein said digital samples define a sine-wave exploration signal, and wherein said marking pulse signals consist of positive and negative marking pulses corresponding to maximum and minimum amplitudes of said exploration signal.

5. A test bench as claimed in claim 4, including a delay circuit interconnected between said marking signal pulse producing means and said modulating means for delaying said marking pulses by a predetermined time.

6. The test bench claimed in claim 3, wherein said low-frequency pulse signal generating means comprises a high stability oscillator (11) supplying a high-frequency pulse signal, and a frequency divider (12) receiving said high-frequency pulse signal for cyclically read addressing said read-only-memory at said low frequency, and further wherein said deducing means comprises means connected to said analyzing means for recovering pulses of said marking signal, thereby supplying a receiving synchronizing signal having said low frequency, and synthesizer multiplier means (82) receiving said synchronization signal and connected to said pulse recovering means for delivering a frequency signal ($V_F$) having a sampling frequency equal to said low frequency multiplied by an integer factor, said receiving synchronization signal and said frequency signal being synchronous with said exploration signal.

7. The test bench claimed in claim 3, wherein said low-frequency pulse signal generating means comprises a programmable divider frequency-dividing said intermediate-frequency pulse signal delivered by said measurement oscillator (27), thereby cyclically read addressing said read-only-memory at said low frequency, wherein said analyzing means comprises a local oscillator slaved to said measurement oscillator through said radio link for supplying a synchronous intermediate-frequency signal, and further wherein said deducing means comprises means connected to said analyzing means for recovering pulses of said marking signal, thereby supplying a receiving synchronization signal having said low frequency, and a frequency divider receiving said synchronous intermediate-frequency signal for delivering a frequency signal having a sampling frequency equal to said low frequency multiplied by an integer factor, said receiving synchronization signal and said frequency signal being synchronous with said exploration signal.

8. The test bench claimed in claim 2, wherein said modulating means comprises a phase modulator (51) delivering said measurement signal phase-modulated during the pulses of said marking signal, and wherein said marking signal pulse recovering means comprises a separator clipper circuit (81) receiving a group propagation time signal produced by said analyzing means for separating by clipping beyond determined thresholds, the marking pulses mixed with said group propagation time signal.

9. The test bench claimed in claim 2, wherein said modulating means comprises a predetermined-ratio frequency divider receiving via a first input said intermediate-frequency pulse signal and via a second input said marking pulse signal, and delivering a frequency modulated measurement signal having first and second frequency states, said first state corresponding to said intermediate frequency divided by said predetermined ratio and being delivered during said marking pulses, and said second state corresponding to said intermediate frequency and being delivered between said marking pulses, and wherein said recovering means (74) receives from said analyzing means (7) a two-frequency-state signal corresponding to said modulated measurement signal and an intermediate-frequency signal from a local oscillator (73) included in said analyzing means, thereby supplying a pulse train having a frequency equal to said intermediate frequency divided by said ratio, during each of said pulses.

10. The test bench claimed in claim 2, wherein said modulating means comprises means (514) for storing a digital code word, and means receiving on inputs said intermediate-frequency pulse signal, said marking pulse signal, and said digital code word, respectively, for delivering said modulated measurement signal, said modulated measurement signal being equivalent to said intermediate frequency pulse signal between said marking pulses, and consisting of an encoded pulse train including said code word during said marking pulses, and wherein said pulse recovering means receives from said analyzing means an encoded signal corresponding to said modulated measurement signal and an intermediate frequency signal from a local oscillator that is included in said analyzing means, thereby supplying said encoded pulse train during each of said marking pulses.

11. the test bench as claimed in claim 10, wherein said means receiving on inputs said intermediate frequency pulse signal, said marking pulse signal, and said digital code word, respectively includes a parallel-input and serial-output shift register (514).

* * * * *